United States Patent
Weifenbach

(10) Patent No.: US 10,287,018 B2
(45) Date of Patent: May 14, 2019

(54) SPACE-OPTIMIZED PASSENGER SEAT ARRANGEMENT FOR A VEHICLE CABIN

(71) Applicant: AIRBUS OPERATIONS GMBH, Hamburg (DE)

(72) Inventor: Jörg Weifenbach, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 15/725,163

(22) Filed: Oct. 4, 2017

(65) Prior Publication Data

US 2018/0029713 A1 Feb. 1, 2018

Related U.S. Application Data

(63) Continuation of application No. PCT/EP2016/057609, filed on Apr. 7, 2016.

(30) Foreign Application Priority Data

Apr. 10, 2015 (DE) .................. 10 2015 105 539

(51) Int. Cl.
 B64D 13/00 (2006.01)
 B64D 11/06 (2006.01)

(52) U.S. Cl.
 CPC ................ B64D 11/0601 (2014.12)

(58) Field of Classification Search
 CPC ........ B64D 11/06; B64D 11/0601; B60N 2/01
 See application file for complete search history.

(56) References Cited

U.S. PATENT DOCUMENTS 1,743,149 A   1/1930   Lyford
4,382,628 A * 5/1983   Palmgren ............... B60N 2/242
                                                    244/118.6
(Continued)

FOREIGN PATENT DOCUMENTS

DE          4116524 A1   11/1992
DE    102012003713 A1   11/1992
(Continued)

OTHER PUBLICATIONS

International Searching Authority, International Search Report for International Application No. PCT/EP2016/057609 dated Aug. 12, 2016.

(Continued)

*Primary Examiner* — Richard G Davis
(74) *Attorney, Agent, or Firm* — Lorenz & Kopf LLP

(57) ABSTRACT

A seat arrangement includes a first group of seats having first and second passenger seats, a second group of seats having third and fourth passenger seats, a first aisle parallel to a longitudinal axis, and a second aisle parallel to the longitudinal axis. The first passenger seat is situated next to the first aisle with a seat direction parallel thereto, and the fourth passenger seat is situated next to the second aisle with a seat direction parallel thereto. The seat direction of the second passenger seat is angled by at least 2° relative to the seat direction of the first passenger seat. The seat direction of the third passenger seat is angled by at least 2° relative to the seat direction of the fourth passenger seat. The first and second groups are next to each other, and have a longitudinal offset relative to each other along the longitudinal axis.

13 Claims, 3 Drawing Sheets

(56) References Cited

U.S. PATENT DOCUMENTS

| | | | |
|---|---|---|---|
| 4,936,620 | A | 6/1990 | Francois et al. |
| 7,780,115 | B2 | 8/2010 | Watanabe |
| 9,126,689 | B2 | 9/2015 | Porter |
| 9,889,936 | B2 | 2/2018 | Campbell et al. |
| 2006/0192050 | A1* | 8/2006 | Cheung .................. B64D 11/00 244/118.6 |
| 2008/0042010 | A1* | 2/2008 | Watanabe ................ B60N 2/01 244/118.6 |
| 2012/0223186 | A1* | 9/2012 | Henshaw ............... B64D 11/06 244/118.6 |
| 2013/0106156 | A1* | 5/2013 | Orson .................... B64D 11/06 297/217.3 |
| 2014/0117727 | A1* | 5/2014 | Campbell .......... B64D 11/0601 297/188.01 |
| 2014/0283296 | A1 | 9/2014 | Jerome et al. |
| 2017/0327232 | A1 | 11/2017 | Morgan |
| 2018/0029712 | A1 | 2/2018 | Sieben et al. |
| 2018/0029713 | A1 | 2/2018 | Weifenbach |

FOREIGN PATENT DOCUMENTS

| | | |
|---|---|---|
| DE | 60212191 T2 | 4/2007 |
| DE | 102008044712 A1 | 3/2010 |
| EP | 1314643 A1 | 5/2003 |
| WO | 2011141134 A1 | 11/2011 |
| WO | 2014049362 A1 | 4/2014 |
| WO | 2016162413 A1 | 10/2016 |

OTHER PUBLICATIONS

USPTO, Office Action for U.S. Appl. No. 15/724,129 dated Jul. 13, 2018.

\* cited by examiner

SPACE-OPTIMIZED PASSENGER SEAT ARRANGEMENT FOR A VEHICLE CABIN

CROSS-REFERENCE TO PRIORITY APPLICATIONS

This application is a continuation of international patent application number PCT/EP2016/057609, having an international filing date of Apr. 7, 2016, which claims 10, 2015. The content of the referenced applications is incorporated by reference herein.

TECHNICAL FIELD

Embodiments of the subject matter described herein generally relate to a passenger seat arrangement for a vehicle cabin and a vehicle comprising a cabin with a floor and a passenger seat arrangement positioned thereon.

BACKGROUND

Vehicles and in particular airplanes comprise an efficiency that depends heavily on the number of installed passenger seats. As known, the number of installed passenger seats can be increased given fixed external dimensions of an airplane fuselage by making cabin monuments smaller or more compact, and/or reducing seat distances or the seat component thickness. However, even this may only be done to a certain extent without significantly diminishing comfort.

For example, German patent document DE 10 2012 003 713 A1 shows an especially narrow and space-saving toilet module, which comprises a toilet unit with a longitudinal extended axis, which includes an angle with the lateral wall that exceeds 0°.

Also known is to provide passenger seat arrangements with offset and turned seats, so as to enhance the comfort for the passengers. For example, such an arrangement is disclosed in European patent document EP 1 314 643 A2.

BRIEF SUMMARY

As a consequence, an object of the disclosure may be regarded as proposing a passenger seat arrangement for a cabin of a vehicle, and in particular of an airplane, which enables not just a larger number of passenger seats, but also an improved comfort in the cabin.

The object is achieved by a passenger seat arrangement with the features of independent claim 1. Advantageous embodiments and further developments may be gleaned from the subclaims and the following description.

Proposed is a passenger seat arrangement for a vehicle cabin comprising at least one first group of passenger seats with a first passenger seat and a second passenger seat, at least one second group of two passenger seats with a third passenger seat and a fourth passenger seat, a first aisle running parallel to a longitudinal axis and a second aisle running parallel to the longitudinal axis. The first passenger seat is situated next to the first aisle with a seat direction parallel thereto. The fourth passenger seat is situated next to the second aisle with a seat direction parallel thereto. A seat direction of the second passenger seat is turned by a first angle of at least 2° relative to the seat direction of the first passenger seat. A seat direction of the third passenger seat is turned by a second angle of at least 2° relative to the seat direction of the fourth passenger seat. The first and second group are situated next to each other, and comprise a longitudinal offset relative to each other along the longitudinal axis.

As a consequence, this passenger seat arrangement defines a group of seats that may extend in particular over an oblong and centrally arranged region inside a passenger cabin. This section is bordered by two aisles running parallel to each other and spaced apart from each other. The first and fourth passenger seats preferably directly border the respective aisle. The definition of the passenger seat arrangement has no bearing on the possibility of arranging additional passenger seats or groups of passenger seats on outside areas on the other sides of the aisles.

The first group and second group are situated longitudinally offset next to each other, so that using a plurality of first and second groups yields a kind of zigzag structure along the region over which the passenger seat arrangement extends.

Located in each group, i.e., in the first group and the second group, are two passenger seats, which are slightly turned toward each other by turning the respective interior passenger seat by at least 2°. The turning here relates to a rotation of the respective passenger seat around a vertical axis that runs vertically to a floor on which the passenger seat arrangement is positioned. The angle indication further relates to an inclined position of a passenger seat relative to the other passenger seat of the same group. An arrangement of two passenger seats situated parallel right next to each other is here to be assumed as the starting point of the rotation, wherein a backrest of the inner passenger seat is situated flush against a back seat of the outer passenger seat. During the rotation by at least 2°, a backrest of the inner passenger seat becomes somewhat more spaced apart from a backrest of the outer passenger seat, wherein the relative movement of the backrests is less than that of the front edges of the accompanying seat surfaces spaced apart from the latter. In this conjunction, a seat direction is to be regarded as the viewing direction of a passenger sitting up completely straight on the respective passenger seat.

Turning the passenger seats relative to each other on the one hand and longitudinally displacing them on the other makes it possible to create an especially advantageous passenger seat structure in the cabin, in which an inlying seat, i.e., the second or third passenger seat, may be situated at least somewhat behind an inlying passenger seat of the other group. By slightly turning the inlying passenger seats outward, and placing a region of a backrest of one inlying passenger seat that comes into contact with a shoulder of the passenger behind a region of a backrest of an inlying passenger seat of the other group that comes into contact with a shoulder of a passenger, the space available for the passenger seat arrangement may be better utilized in the transverse direction than with known arrangements, in which the passenger seats are situated parallel to each other. Without restricting legroom, this can even lead to a widening of the first and second aisle without increasing the cabin width.

Situating the outer seats, i.e., the first passenger seat and fourth passenger seat, parallel to the first or second aisle delineates the aisle more precisely overall. This reduces the risk of cabin personal, cabin trolleys and the like hitting the shoulders or knees of passengers on the passenger seats facing toward the aisles.

As a consequence, the passenger seat arrangement according to an embodiment of the invention enables an improved space utilization not just in the longitudinal direction, but also in a transverse direction of the cabin. The passenger seat arrangement overall is very advantageous for creating a space-efficient and comfortable passenger cabin, wherein no modifications are required in terms of a having a usual seat distance or making the monuments smaller or more compact.

In order to realize such a passenger seat arrangement, it may be necessary to fabricate seat frames tailored thereto, for example which are limited to a respective first group of two passenger seats or a second group of two passenger seats. The longitudinal offset between the two groups here remains freely adjustable. Alternatively, the first group and second group may also be arranged on a single seat frame, but this would prescribe a fixed size for the longitudinal offset.

In an advantageous embodiment, the longitudinal offset may correspond at most to one and a half times the depth of a passenger seat. The depth is here to be understood as the extension of a seat surface of the respective passenger seat in the longitudinal direction, i.e., along the respective seat direction. The larger the longitudinal offset, the more the two groups of passenger seats may be pushed together in a transverse direction, up to a specific size for the longitudinal offset. However, when configuring the passenger seat arrangement in the respective cabin, consideration is to be given to the longitudinal offset actually required for being able to reach a specific transverse offset. The size of the longitudinal offset is preferably to be adjusted in such a way that certain advantages may still be easily realized, and a transverse offset ranging from 2 to 5 inches arises, which corresponds approximately to 5.1 to 12. 7 cm, and ensures sufficient shoulder room, while at the same time allowing a compact arrangement in the longitudinal direction. It would be especially advantageous for a size of the longitudinal offset to lie within the range of half a seat distance, for example measuring 32 inches or 34 inches, approximately 81.3 cm or 86.4 cm.

In an advantageous embodiment, the first group and second group comprise a transverse offset corresponding to at most half the width of a passenger seat in a transverse axis that is perpendicular to the longitudinal axis and lies in an extension plane of the passenger seat arrangement. A passenger seat may comprise a clear span measured between the armrests of 18 inches, approximately 45.7 cm, for example which is enhanced by two armrests with a width of 2 inches, approximately 5.1 cm. The transverse offset preferably lies within a range of 2 to 5 inches, approximately 5.1 to 12.7 cm, as already mentioned above.

It is especially preferable that the angle and second angle be identical. As a consequence, the two seats in the two groups of passenger seats are turned toward each other in the same way, so that the twisting angle of the two inlying passenger seats relative to each other here doubles. Selecting the same angle can result in a symmetrical arrangement, which yields advantages for a harmonious configuration of the interior and identical boundary conditions in terms of entering and exiting the passenger cabin.

The first angle and second angle may preferably measure at most 9°. The special technical effect of the embodiment outlined above does not require very large twisting angles for the inlying passenger seats, since the twisting is to generate shoulder room in particular. Excessive twisting would also significantly widen each group of passenger seats, thereby at least partially canceling out the beneficial effects mentioned herein. It has proven especially advantageous to select a first angle and second angle measuring between 3° and 6°.

The leg and shoulder room may be improved even further by situating a backrest of the second passenger seat and a backrest of the third passenger seat asymmetrically to a seat surface, and shifting them by a backrest offset toward the first passenger seat or toward the fourth passenger seat. Specifically, this means that the respective inlying passenger seats comprises a backrest that is outwardly shifted toward the respectively closest aisle. This shift is executed by an amount referred to as the backrest offset, and can in particular enable improved legroom for a passenger behind the respective inner seat.

It can prove sufficient to select a backrest offset ranging from 2.5 to 5 cm, which corresponds to a size measuring about or somewhat less than the width of an armrest. In this conjunction, it is clear that at least regions of the respective armrest are also at least partially offset.

The second and third passenger seats each comprise an armrest directed toward the third or second passenger seat, which each comprise a convex indentation projecting into the backrest offset. This may be achieved by incorporating a kink or reflexed edge ("S-Schlag"), or by completely omitting a section of an armrest situated in proximity to the backrest.

The passenger seat arrangement may further comprise several first groups and several second groups, which each are situated one directly behind the other offset by a seat distance. As a consequence, several first groups are situated one directly behind the other, while several second groups are situated one directly behind the other.

The seat distance may here lie within a range of between 75 and 90 cm, wherein a seat distance of 32 inches, approx. 81.3 cm, is especially suitable.

As already mentioned above, the longitudinal offset may measure approximately half a seat distance, and thus exemplarily lie within a range of between 30 and 50 cm.

Another advantageous embodiment further comprises an additional passenger seat, which is situated directly between the first passenger seat or fourth passenger seat and the adjacent aisle, aligned parallel thereto, and has a longitudinal offset relative to the first passenger seat or fourth passenger seat. As a result, a central region in a passenger cabin may even accommodate five passenger seats. Enhanced with two lateral regions with passenger rows for three passengers, a total of 11 passengers may be accommodated per row of seats.

Embodiments of invention further relate to a vehicle comprising a cabin with a floor and a passenger seat arrangement positioned thereon. In particular, this passenger seat arrangement may be designed as an oblong, central section within a cabin.

Finally, the vehicle can comprise at least one third group of passenger seats, which is situated on a side of the first or second aisle facing away from the first and second groups. The latter are then designed as lateral or side sections.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Additional features, advantages and possible applications of the present disclosure may be gleaned from the following description of the exemplary embodiments and the figures. All described and/or graphically illustrated features here constitute the subject matter of the disclosure, whether taken separately or in any combination, even regardless of their composition in the individual claims or back references thereto. In addition, identical reference numbers on the figure stand for the same or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
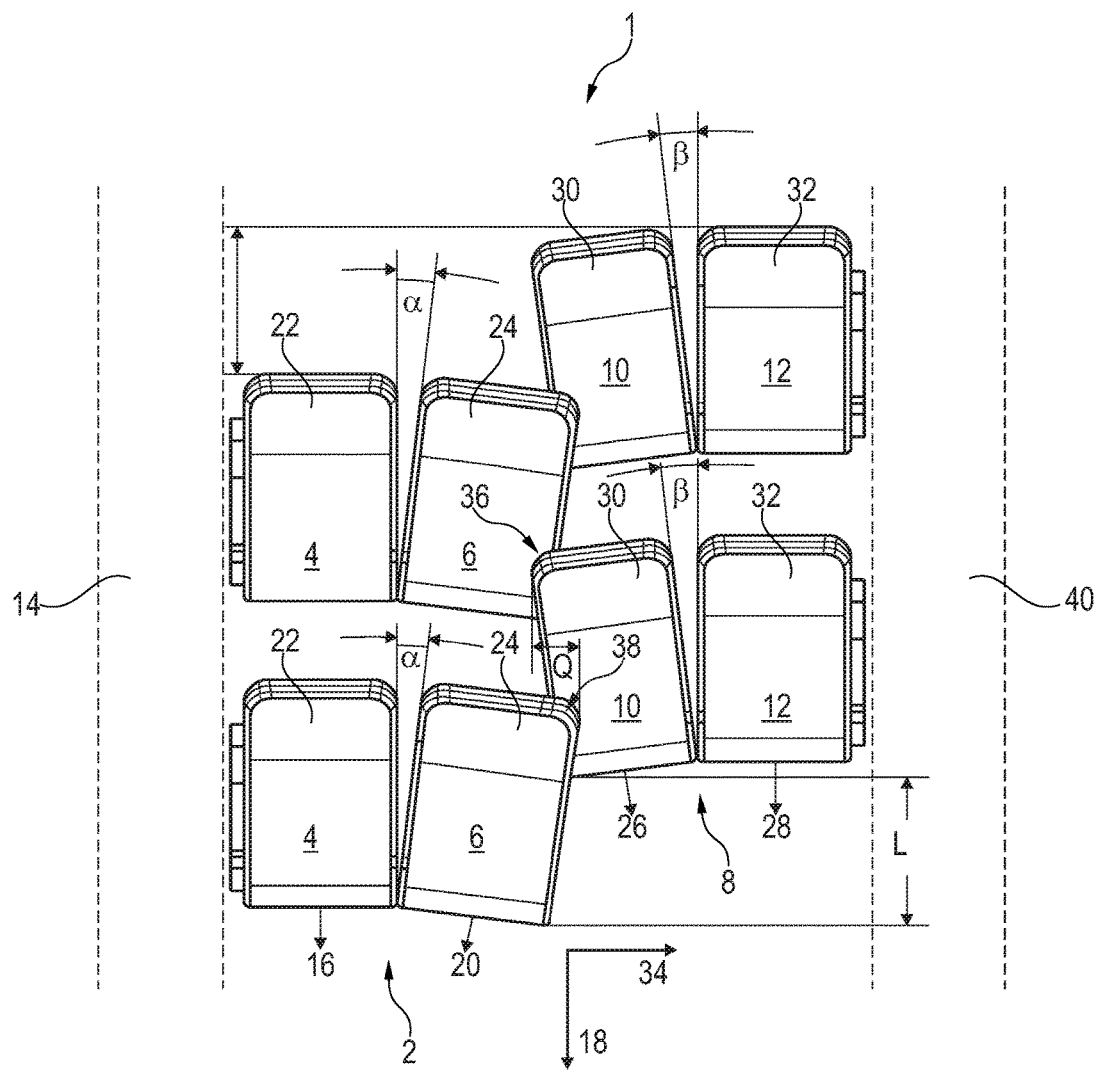
FIG. 1 shows a top view of a first exemplary embodiment of a passenger seat arrangement.

FIG. 1 shows a passenger seat arrangement 1 with a first group 2 of two passenger seats 4 and 6 as well as a second group 8 of passenger seats 10 and 12. The first passenger seat 4 is situated directly against and parallel to a first aisle 14, so that a first seat direction 16 allocated to the passenger seat 4 is parallel to a longitudinal axis 18 of the passenger seat arrangement 1 or accompanying cabin. A second seat direction 20 of the second passenger seat 6 is turned by a first angle α relative to the seat direction 16 around a vertical axis vertical to a floor.

The first angle α should measure at least 2°. As a result, two backrests 22 and 24 of the two passenger seats 4 and 6 are spaced somewhat further apart from each other than would be the case given completely parallel seat directions 16 and 20. Twisting the second passenger seat 6 relative to the first passenger seat 4 makes it possible to improve shoulder room on both passenger seats 4 and 6, for which a rotation by 3° to 6° may already suffice.

The second group 8 with the third passenger seat 10 and fourth passenger seat 12 is configured in the same way, but mirror-inverted. That is to say, a seat direction 26 of the third passenger seat 10 is slightly directed or turned toward a seat direction 28 of the fourth passenger seat 12, so that the backrests 30 and 32 are spaced further apart than would be the case given seats 10 and 12 situated parallel to each other.

The second group 8 is spaced apart by a longitudinal offset L in the longitudinal direction 18. For example, the longitudinal offset L may correspond to a seat depth or approximately half a seat distance. This makes it possible to achieve a slight nesting of the first groups 2 and second groups 8, i.e., an overlapping in a transverse direction 34, in which an inlying boundary 36 of a third passenger seat 10 lies closer to the first aisle 14 in a transverse direction than an inlying border 38 of the second passenger seat 6. Conversely, the inlying border 38 of the second passenger seat is closer to the second aisle 40 than the inlying border 36 of the third passenger seat 10. This yields a transverse offset Q, which for example may lie within a range of 2 to 5 inches, about 5.1 to 12.7 cm. This gives enough legroom to a passenger on the third passenger seat 10, along with enough shoulder room to a passenger on the second passenger seat 6 and third passenger seat 10. Since the longitudinal offset L comprises a manageable size at an exemplary 16 to 18 inches, about 40.6 cm to 45.7 cm, a sufficient number of rows with passenger seats along the passenger seat arrangement 1 may still be reached.

Figure 2:
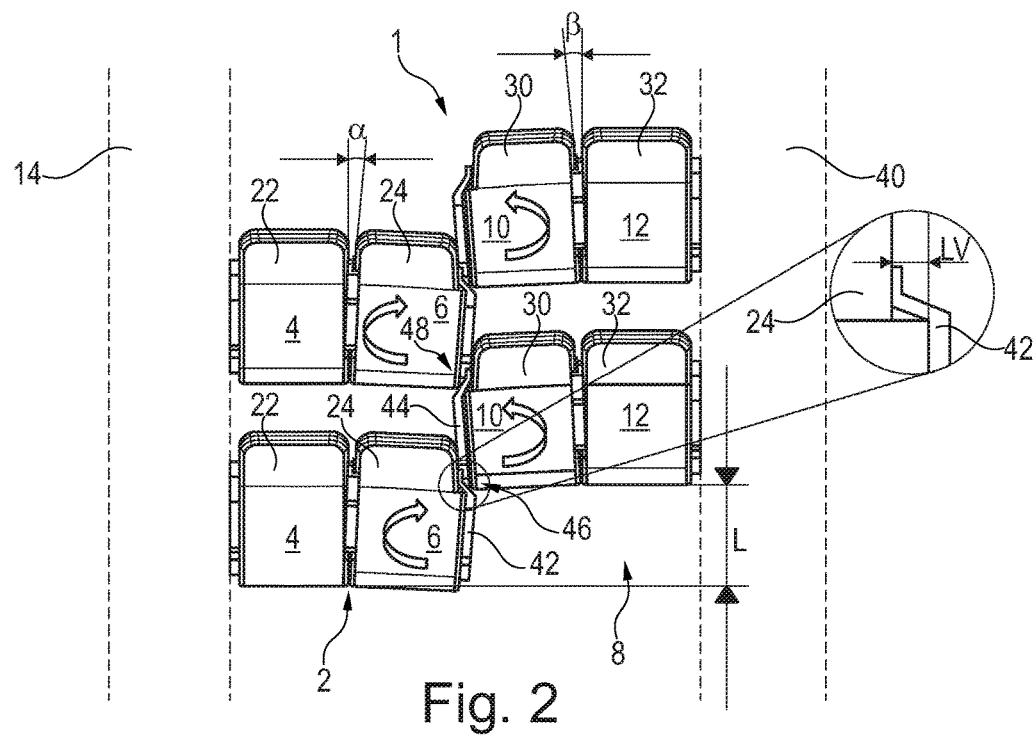
FIG. 2 shows a top view of a second exemplary embodiment of a passenger seat arrangement.

As shown on FIG. 2, further improvement may be achieved by offsetting the backrests 24 and 30 of the inlying passenger seats 6 and 10 relative to the respectively closer first aisle 14 or second aisle 40 by a backrest offset LV, so as precisely not to disrupt in particular the legroom of a passenger on the respective passenger seat lying behind it. An armrest 42 of the second seat 6 along with an arm rest 44 of the third passenger seat 10 may outwardly follow the offset of the respective backrest 24 and 30, thereby resulting in corresponding indentations 46 or 48. This makes it possible to limit the necessary rotational angle of the second passenger seat 6 and third passenger seat 10; in addition, the longitudinal offset L may be reduced somewhat.

Figure 3:
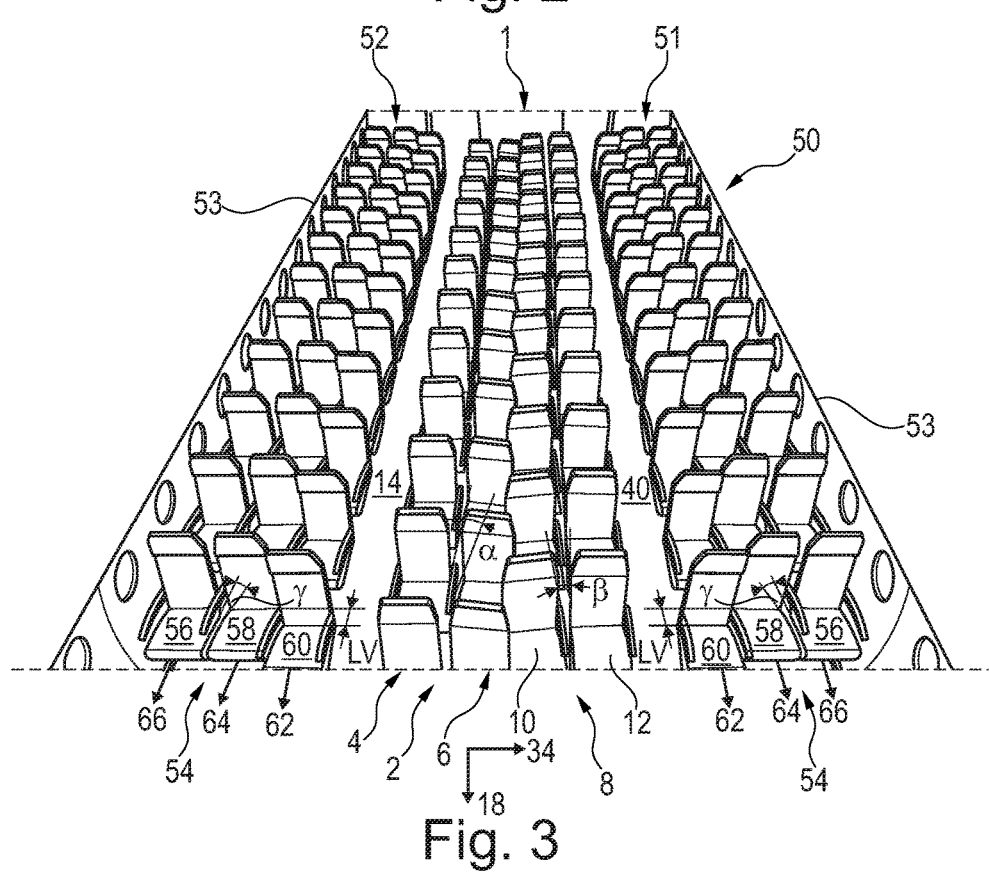
FIG. 3 shows a perspective view of a cabin with a passenger seat arrangement enhanced to include additional passenger seats.

The configuration of a passenger cabin 50 shown in a perspective view on FIG. 3 may arise overall, in which in particular the first aisle 14 and second aisle 40 can be designed with quite a comfortable width. The passenger seat arrangement 1 with the features described above is positioned in a central region. Additional mirror-inverted passenger seat arrangements 51 and 52 extending up to a cabin wall 53 may be integrated to the sides of aisles 14 and 40. A passenger seat arrangement 51 or 52 comprises a third group 54 of passenger seats with a fifth or eighth passenger seat 56 and a sixth or ninth passenger seat 58, and adjacent thereto an individual seventh or tenth passenger seat 60. For example, the seventh or tenth passenger seat 60 is directly situated on the aisle 14 or 40 in a seat direction 62 parallel thereto.

A seat direction 64 of the sixth or ninth passenger seat 58 is turned by a third angle y of at least 2° relative to a seat direction 66 of the fifth or eighth passenger seat 56. The third group 54 of passenger seats and the seventh or tenth passenger seat 60 are situated next to each other, and comprise a longitudinal offset LV relative to each other along the longitudinal axis 16. For example, the latter may be less than or equal to half the depth of a passenger seat, selected preferably from a range of 4 to 7 inches, about 10.2 cm to 17.8 cm, and particularly preferably from a range of 5 inches to 6 inches, about 12.7 cm to 15.2 cm, thereby achieving a sufficient spatial decoupling of the shoulders of a passenger on the fifth to tenth passenger seats 56, 58 and 60 even in the outer, lateral regions of the passenger cabin 50.

Figure 4:
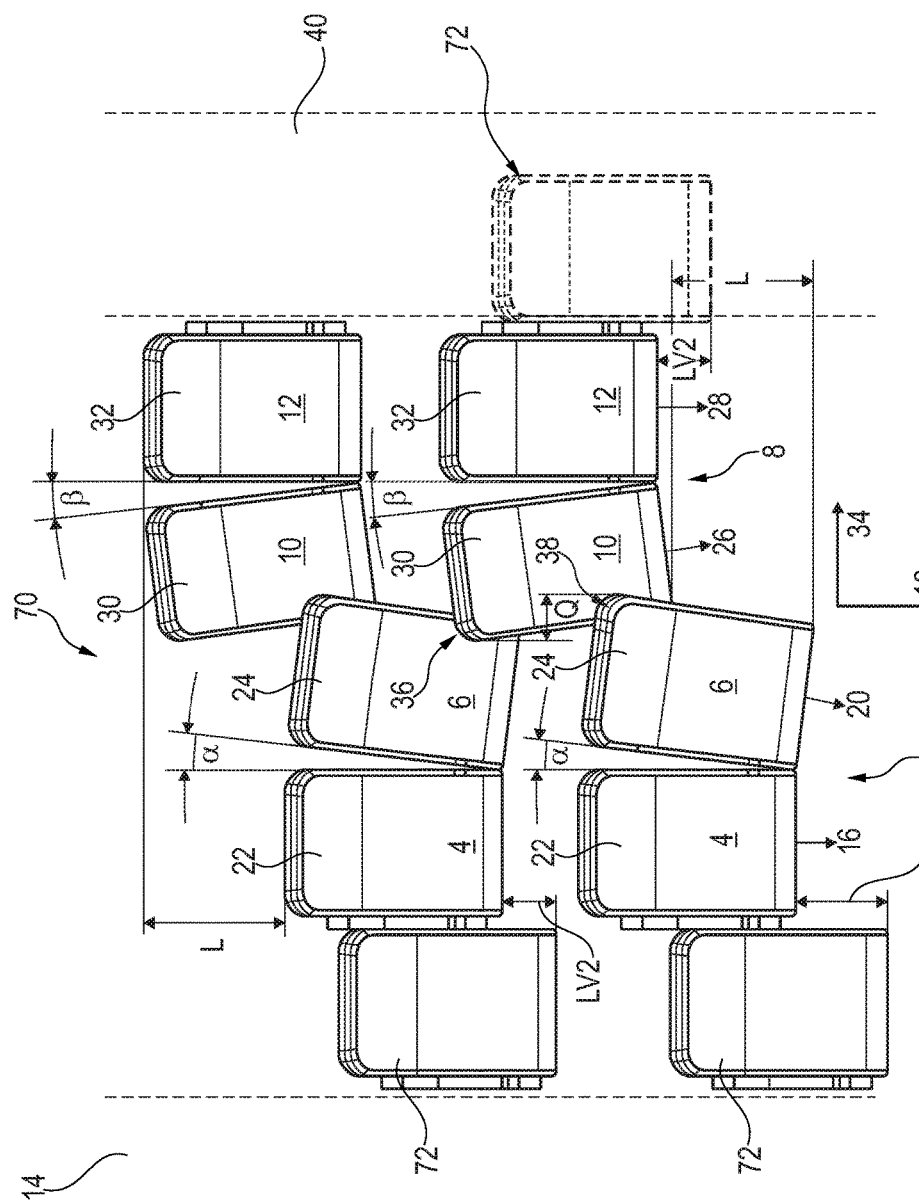
FIG. 4 shows a top view of a third exemplary embodiment of a passenger seat arrangement.

Integrating a solitary passenger seat between the first group 2 and second group 8 or on a side directed toward an aisle 14 or 40 with an additional longitudinal offset, such as the seventh or tenth passenger seat 60 next to the third group 54, is conceivable for integrating an eleventh seat in a seat row. This is exemplarily shown on FIG. 4.

Shown here is a passenger seat arrangement 70 that may correspond to the one on FIG. 1 or FIG. 3, wherein an eleventh passenger seat 72 situated parallel to the first passenger seat 4 is present in addition to the first group 2 on the aisle 14, and comprises a longitudinal offset LV2 that may exemplarily correspond to the longitudinal offset LV between the third group 54 and seventh or tenth passenger seat 60. The eleventh passenger seat 72 may alternatively also be situated next to the second group 8 on the aisle 40 (see dashed line), which would lead to less of an extension in the longitudinal direction, and for this reason may also be preferred. The length offset LV2 facilitates shoulder room on the eleventh passenger seat 72 and the first passenger seat 4, and further makes it possible to reach the first passenger seat 4 and second passenger seat 6 from the respective aisle 14 or 40.

In addition, let it be noted that "comprising" does not preclude any other elements or steps, and that "a" or "an" do not rule out a plurality. Let it further be noted that features described with reference to one of the above exemplary embodiments can also be used in combination with other features of other exemplary embodiments described above. Reference numbers in the claims are not to be regarded as a limitation.

What is claimed is:

1. A passenger seat arrangement for a vehicle cabin, comprising:
   at least one first group of passenger seats with a first passenger seat and a second passenger seat;
   at least one second group of two passenger seats with a third passenger seat and a fourth passenger seat;
   a first aisle running parallel to a longitudinal axis; and
   a second aisle running parallel to the longitudinal axis;
   wherein the first passenger seat is situated next to the first aisle with a seat direction parallel thereto;
   wherein the fourth passenger seat is situated next to the second aisle with a seat direction parallel thereto;
   wherein a seat direction of the second passenger seat is turned by a first angle of at least 2° relative to the seat direction of the first passenger seat;
   wherein a seat direction of the third passenger seat is turned by a second angle of at least 2° relative to the seat direction of the fourth passenger seat; and
   wherein the first group and second group are situated next to each other, and comprise a longitudinal offset relative to each other along the longitudinal axis, wherein the longitudinal offset corresponds at most to one and a half times the depth of a passenger seat.

2. The passenger seat arrangement of claim 1, wherein the first angle and second angle are identical.

3. The passenger seat arrangement of claim 1, further comprising several first groups and several second groups, which each are situated one directly behind the other offset by a seat distance.

4. The passenger seat arrangement of claim 3, wherein the seat distance ranges between 80 and 90 cm.

5. The passenger seat arrangement of claim 1, wherein the longitudinal offset ranges between 30 and 50 cm.

6. The passenger seat arrangement of claim 1, further comprising an additional passenger seat, which is situated directly between the first passenger seat or fourth passenger seat and the adjacent aisle, aligned parallel thereto, and has a longitudinal offset relative to the first passenger seat or fourth passenger seat.

7. A passenger seat arrangement for a vehicle cabin, comprising:
   at least one first group of passenger seats with a first passenger seat and a second passenger seat;
   at least one second group of two passenger seats with a third passenger seat and a fourth passenger seat;
   a first aisle running parallel to a longitudinal axis; and
   a second aisle running parallel to the longitudinal axis;
   wherein the first passenger seat is situated next to the first aisle with a seat direction parallel thereto;
   wherein the fourth passenger seat is situated next to the second aisle with a seat direction parallel thereto;
   wherein a seat direction of the second passenger seat is turned by a first angle of at least 2° relative to the seat direction of the first passenger seat;
   wherein a seat direction of the third passenger seat is turned by a second angle of at least 2° relative to the seat direction of the fourth passenger seat;
   wherein the first group and second group are situated next to each other, and comprise a longitudinal offset relative to each other along the longitudinal axis; and
   wherein the first group and second group comprise a transverse offset corresponding to at most half the width of a passenger seat in a transverse axis that is perpendicular to the longitudinal axis and lies in an extension plane of the passenger seat arrangement.

8. A passenger seat arrangement for a vehicle cabin, comprising:
   at least one first group of passenger seats with a first passenger seat and a second passenger seat;
   at least one second group of two passenger seats with a third passenger seat and a fourth passenger seat;
   a first aisle running parallel to a longitudinal axis; and
   a second aisle running parallel to the longitudinal axis;
   wherein the first passenger seat is situated next to the first aisle with a seat direction parallel thereto;
   wherein the fourth passenger seat is situated next to the second aisle with a seat direction parallel thereto;
   wherein a seat direction of the second passenger seat is turned by a first angle of at least 2° relative to the seat direction of the first passenger seat;
   wherein a seat direction of the third passenger seat is turned by a second angle of at least 2° relative to the seat direction of the fourth passenger seat;
   wherein the first group and second group are situated next to each other, and comprise a longitudinal offset relative to each other along the longitudinal axis; and
   wherein the first angle and second angle measure at most 9°.

9. The passenger seat arrangement of claim 8, wherein the first angle and second angle are in a range of 3° to 6°.

10. A passenger seat arrangement for a vehicle cabin, comprising:
    at least one first group of passenger seats with a first passenger seat and a second passenger seat;
    at least one second group of two passenger seats with a third passenger seat and a fourth passenger seat;
    a first aisle running parallel to a longitudinal axis; and
    a second aisle running parallel to the longitudinal axis;
    wherein the first passenger seat is situated next to the first aisle with a seat direction parallel thereto;
    wherein the fourth passenger seat is situated next to the second aisle with a seat direction parallel thereto;
    wherein a seat direction of the second passenger seat is turned by a first angle of at least 2° relative to the seat direction of the first passenger seat;
    wherein a seat direction of the third passenger seat is turned by a second angle of at least 2° relative to the seat direction of the fourth passenger seat;
    wherein the first group and second group are situated next to each other, and comprise a longitudinal offset relative to each other along the longitudinal axis; and
    wherein a backrest of the second passenger seat and a backrest of the third passenger seat are situated asymmetrically to a seat surface, and shifted by a backrest offset toward the first passenger seat or toward the fourth passenger seat.

11. The passenger seat arrangement of claim 10, wherein the backrest offset is in a range of 2.5 cm to 5 cm.

12. The passenger seat arrangement of claim 10, wherein the second passenger seat and third passenger seat each comprise armrests directed toward the third passenger seat or second passenger seat, which each comprise a convex indentation projecting into the backrest offset.

13. A vehicle comprising:
a cabin with a floor; and
a passenger seat arrangement positioned on the floor of the cabin, the passenger seat arrangement comprising:
at least one first group of passenger seats with a first passenger seat and a second passenger seat;
at least one second group of two passenger seats with a third passenger seat and a fourth passenger seat;
a first aisle running parallel to a longitudinal axis;
a second aisle running parallel to the longitudinal axis; and
at least one third group of passenger seats, which is situated on a side of the first aisle or second aisle facing away from the first and second groups;
wherein the first passenger seat is situated next to the first aisle with a seat direction parallel thereto;
wherein the fourth passenger seat is situated next to the second aisle with a seat direction parallel thereto;
wherein a seat direction of the second passenger seat is turned by a first angle of at least 2° relative to the seat direction of the first passenger seat;
wherein a seat direction of the third passenger seat is turned by a second angle of at least 2° relative to the seat direction of the fourth passenger seat; and
wherein the first group and second group are situated next to each other, and comprise a longitudinal offset relative to each other along the longitudinal axis.

* * * * *